Sept. 26, 1961     L. S. SANDERS     3,001,322

GAME BIRD CALLING DEVICE

Filed Nov. 28, 1958

INVENTOR.
Lowell S. Sanders
BY Thos. E. Scofield
ATTORNEY.

United States Patent Office 3,001,322
Patented Sept. 26, 1961

3,001,322
GAME BIRD CALLING DEVICE
Lowell S. Sanders, 1508 Marsh, Kansas City, Mo.
Filed Nov. 28, 1958, Ser. No. 776,902
2 Claims. (Cl. 46—180)

This invention relates to improvements in vibrating reed sound producing devices and refers more particularly to a sound producing device of this type designed to simulate the calls of game birds.

As is well known, many hunters of game birds employ devices which simulate the sounds of the game birds they are seeking in order to attract them within gun range. Several devices designed for this specific purpose are presently on the market. Briefly and broadly described, all that I am aware of have in common a mouthpiece adapted to be put to the lips of the hunter, a vibratile reed and supporting tongue which produce the sound vibrations as air is forced past the reed and a resonating sound pipe for picking up and broadcasting the reed vibrations.

During the use of game calling devices of this type by the hunter, it often becomes necessary to clean the device while still in the field or blind. Inevitably, seeds bits of plants or other foreign material become lodged in the instrument to the extent that proper operation is severely impaired, if not stopped altogether. It thus becomes necessary for the hunter to completely disassemble the calling device, clean it out and reassemble it. However, several problems are presented in the field stripping and cleaning operation of the devices of which I am aware.

As might be expected, each device is designed and carefully assembled by the manufacturer to produce the proper call with particular reference to vibratile reed length, position on the tongue, point of clamping of the reed to the tongue, and relationship of the position of the reed with respect to the sounding pipe. Obviously, stripping and cleaning in the field destroys the effect of the careful work which has originally been put in by the manufacturer in assembling the devices. Ordinarily the hunter has little time in which to carefully measure and index relative positions of the various components during reassembly, even in the rare event that he is capable of establishing the exact relationships necessary. Consequently, loss of the use of the calling device early in the hunt often occurs.

There are other problems also. In many calling devices, the materials used are subject to absorption of moisture which may cause expansion of critical components to the point that the effectiveness of the call is destroyed. There is likewise the problem of freezing of this moisture in extremely cold weather. Sometimes the parts are so associated and put together that there is danger of damaging the delicate reed structure in carrying out the necessary steps for taking the device apart and putting it back together.

It is a principal object of the present invention to provide an improved calling device of the character described in which the construction and manner of assembly is such that the problems discussed above are eliminated. By my invention I provide a game bird caller which lends itself to rapid and facile disassembly in the field and yet which is so constructed that reassembly in exacly the same fashion as it left the manufacturer is easily accomplished without requiring or permitting any judgment on the part of the user as to the proper position the components must take on reassembly. I further provide a construction in which there is little, if any, danger of damaging the delicate reed structure during the cleaning and stripping operation, and in which clamping of the reed to the tongue is accomplished by means not subject to water damage.

Another object of the invention is to provide a structure in which certain of the critical elements are easily replaceable in the event of loss. The advantage of this arrangement is that it is possible to make the calling device usable again and thus avoid the expense involved in purchasing a completely new one.

A further feature of the invention is that its construction results in the production of a clear and true simulation of the actual call of the game bird under extreme variations in climatic conditions, and furthermore results in a call which is of sufficient volume to carry relatively great distances.

Other and further objects of the invention, together with the features of novelty appurtenant thereto will appear in the course of the following description.

In the accompanying drawing which forms a part of the specification and is to be read in conjunction therewith, and in which like reference numerals indicate like parts in the various views.

Figure 1:
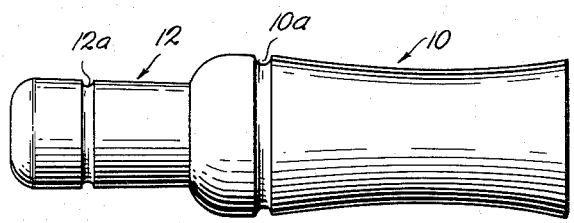
FIG. 1 is a side view of the device embodying the invention.
Figure 2:
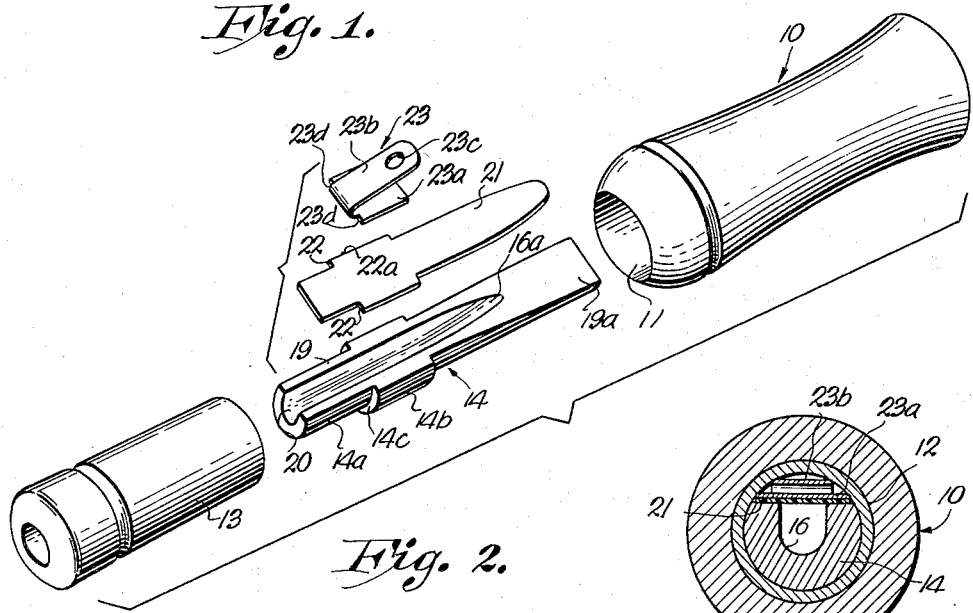
FIG. 2 is a perspective view of the device with the components shown in exploded relation, that is, disassembled from one another.

Referring now to the drawnig, reference numeral 10 indicates generally the mouthpiece of the device. In its preferred form this takes the shape generally of a bell and is of tubular construction. Preferably it is provided with a central cylindrical bore 11 provided at the outer end with a flared section 11a. It is the flared end of the mouthpiece that is to be put to the lips of the user when the device is in operation.

Fitting within the bore 11 at the other end of the mouthpiece is the tubular sound pipe 12. It will be observed that the outer surface of the pipe 12 is slightly tapered so that when it is inserted in the bore it will be retained therein in a wedging tight fit. Both the mouthpiece 10 and sound pipe 12 are preferably constructed of good quality hard wood such as walnut. Grooves 12a and 10a in the sound pipe and mouthpiece respectively, may be provided, if desired, to provide means for attaching the parts to cords or lines. These grooves, however, play no part in the invention.

Preferably the sound pipe 12 is composed of two sections, namely, the tubular main section 13 and a tongue forming section 14. The section 12 is provided with a central bore having portions of different diameter, there being an end bore 15, an intermediate bore 16 of somewhat greater diameter than the end bore, and a counter bore 17 still of greater diameter. The counter bore 17 provides a shoulder 18, the purpose of which will be later explained.

The tongue section 14 is generally semi-circular in transverse cross section throughout its length and is provided with a first portion 14a which fits within the bore 16 of the sound pipe and a second portion 14b of somewhat greater diameter which fits within and corresponds to the diameter of the counter bore 17. The enlarged diameter portion 14b provides a stop surface 14c which abuts against and registers with the shoulder 18, thus to index the section 14 inside the tubular section 13. In practice it is usually desirable to glue or otherwise firmly adhere sections 13 and 14 together during manufacture of the device.

The top surface 19 of the section 14 is flat throughout a major portion of its length, particularly that portion which is contained within the bore of the tubular section 13. As is evident the surface 19 is provided with a longitudinal groove 20 which tapers upwardly at the inner end as shown at 20a. There is likewise a falling off of the top surface 19 toward its inner end as shown at 19a.

By virtue of forming the section 14 with a generally semi-circular cross section, a recess with one end opening into the mouthpiece is formed by the surface 19 and the exposed arcuate portion of the bore 17. This recess continues on through the sound pipe, being partially interrupted, however, by the exposed portion of the annular shoulder 18 earlier referred to.

The surface 19 of the sound pipe section 14 provides a base and support for a vibrating reed indicated at 21. Preferably this reed is constructed of a phenolic plastic such as Bakelite, a rigid vinyl, or a resin reinforced thin glass sheet. Its thickness and length are, of course, dictated by the frequency of vibration desired, as is its stiffness. These are, however, matters of common knowledge in the manufacture of devices such as this and no further explanation will be given here.

It will be observed that the reed 21 is provided with a central section 22a of greater width through the balance of the reed and which corresponds to the enlarged diameter portion 14b of section 14. This section 22a provides shoulders 22 which, when the reed is inserted in the recess earlier referred to, eventually engage and are stopped by the shoulder 18 within the recess. In other words, in assembling the device the reed is positioned simply by laying it on surface 19 and pushing it into the sound pipe until the portions 22 of the reed engage the shoulder.

The reed is retained upon and firmly clamped to the tongue 14 by means of a clip 23 having the flat, reed-engaging leg 23a and a narrower reversely bent resilient leg 23b. Preferably the clip 23 is formed of brass, because of the resistance of brass to corrosion and its resiliency. In the outer end of the upwardly inclined leg 23b there is provided an aperture 23c, the purpose of which will be later described.

Figure 4:
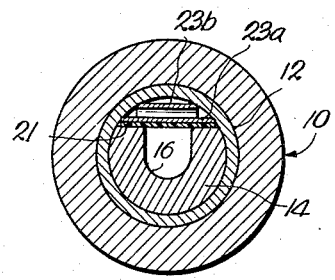
FIG. 4 is a sectional view taken along the line 4—4 of FIG. 3 in the direction of the arrows.
Figure 3:
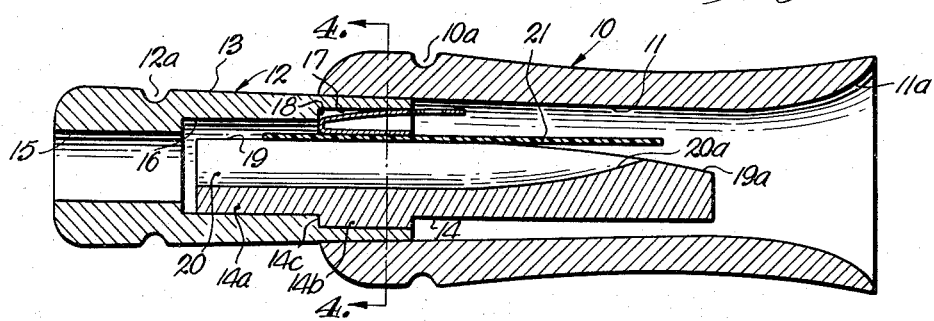
FIG. 3 is an enlarged longitudinal sectional view of the device in assembled condition.

In its assembled relationship with the reed and the tongue 14, the clip is located within the recess between the wall of the bore 17 and the surface 19 of the tongue, as shown in FIGS. 3 and 4.

As will be observed, the apex of the V-shaped clip extends into the recess with the leg 23a in firm contact with the reed and inclined leg 23b extending back out of the recess and into the mouthpiece. The leg 23b must be given a length such that it will extend well into the bore of the mouthpiece, and the aperture 23c should be located as to be wholly outside the recess, or at least to present enough of the aperture as to permit engagement therein of a matchstick, knife point or other article. In its normal undistorted form the leg 23b is at an angle with respect to leg 23a greater than that which results when the clip is inserted in the recess. It is thus evident that in order to put the clip into the recess it will have to be forced therein, putting the clip under spring tension and thus compressing the reed into tight contact with surface 19.

The spring clip is provided with portions 23d which, when the clip is inserted, serve to engage the shoulder 18 earlier referred to and halt movement of the clip at the desired point. The length of leg 23a is such that when the clip is inserted to the point that the portions 23d engage the shoulder, the proper length of reed 21 will be left free for vibration. This again is a matter to be determined by the frequency of the sound desired and will vary according to the particular game bird, for example, duck or goose, for which the calling device is designed.

Disassembly of the calling device for cleaning or any other purpose is accomplished simply by disconnecting the mouthpiece 10 from the sound pipe 12 and then removing the clip 23 by either grasping the extension of leg 23b, or inserting a sharp pointed instrument in the aperture 23c and pulling outwardly on the clip. While some force is necessary to overcome the spring action of the clip, nevertheless, it is not excessive and the clip is easily removed. Once the clip has been removed, the reed can be withdrawn with ease and all components thoroughly cleaned, either by wiping with cloth or suitable cleaning devices, or blowing foreign matter therefrom.

To reassemble the device the reed is first placed on the surface 19 and moved back into the sound pipe until the portions 22 of the reed strike the shoulder 18. This indexes the reed in its proper position. Then the clip is placed in position to be inserted in the recess and by using a knife or other blade-like or rod-like article the clip is forced into the recess until the portions 23d likewise strike shoulder 18. The shoulder 18 thus indexes both the reed and clip in the original position they assumed in the device. The mouthpiece 10 is then coupled again with the sound pipe and the device is ready for use.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. A calling device for game birds comprising a tubular mouthpiece, a sounding pipe telescopically fitted in said mouthpiece, a grooved tongue extending longitudinally from that end of the sound pipe within the mouthpiece, a recess within the sounding pipe having an opening adjacent the tongue, the recess having a base which forms an extension and continuation of the tongue within the sounding pipe, a shoulder surface within the recess disposed normal to the base of the recess, a reed lying longitudinally of the tongue and extending into said recess, that end of the reed within the recess having portions which engage the shoulder and prevent further movement of the reed into the recess, and a V-shaped resilient clip force fitted into said recess with the apex of the V toward the inner end of the recess, one leg of the clip in contact with and compressing the reed into firm engagement with the base, and the other leg contacting and pressing against the top of the recess, said other leg extending outside the recess and spaced above the tongue, said clip having portions which engage said shoulder in the recess to index the position of the clip relative the base.

2. A calling device for game birds as in claim 1 wherein the portion of said other leg extending outside the recess is provided with an aperture therethrough.

References Cited in the file of this patent

UNITED STATES PATENTS

| | | |
|---|---|---|
| 1,484,148 | Olt | Feb. 19, 1924 |
| 2,317,458 | Herter | Apr. 27, 1943 |
| 2,493,472 | Yentzen | Jan. 3, 1950 |
| 2,518,616 | Herter | Aug. 15, 1950 |
| 2,551,367 | Fahey | May 1, 1951 |
| 2,559,781 | McMahon | July 10, 1951 |
| 2,833,085 | Wintriss | May 6, 1958 |